US012318790B2

(12) United States Patent
Bitzel et al.

(10) Patent No.: US 12,318,790 B2
(45) Date of Patent: Jun. 3, 2025

(54) DEVICE FOR APPLYING VISCOUS MATERIAL TO WORKPIECES

(71) Applicant: Atlas Copco IAS GmbH, Bretten (DE)

(72) Inventors: Heiko Bitzel, Karlsruhe (DE); Bastian Prinz, Bruchsal (DE)

(73) Assignee: Atlas Copco IAS GmbH, Bretten (DE)

( * ) Notice: Subject to any disclaimer, the term of this patent is extended or adjusted under 35 U.S.C. 154(b) by 512 days.

(21) Appl. No.: 17/790,899

(22) PCT Filed: Feb. 1, 2021

(86) PCT No.: PCT/EP2021/052329

§ 371 (c)(1),
(2) Date: Jul. 5, 2022

(87) PCT Pub. No.: WO2021/156210

PCT Pub. Date: Aug. 12, 2021

(65) Prior Publication Data

US 2023/0026219 A1 Jan. 26, 2023

(30) Foreign Application Priority Data

Feb. 5, 2020 (DE) ..................... 10 2020 102 871.7

(51) Int. Cl.
*B05B 1/16* (2006.01)
*B05B 1/30* (2006.01)
*B05C 5/02* (2006.01)

(52) U.S. Cl.
CPC ............ *B05B 1/1609* (2013.01); *B05B 1/306* (2013.01); *B05C 5/0225* (2013.01); *B05C 5/0237* (2013.01); *B05C 5/0279* (2013.01)

(58) Field of Classification Search
CPC ... B05B 1/1609; B05B 1/306; B05B 13/0431; B05C 5/0225; B05C 5/0237; B05C 5/0279
See application file for complete search history.

(56) References Cited

U.S. PATENT DOCUMENTS 3,442,491 A 5/1969 Messerschmidt
4,842,162 A 6/1989 Merkel
(Continued)

FOREIGN PATENT DOCUMENTS

CN 109311043 A 2/2019
CN 109644560 A 4/2019
(Continued)

OTHER PUBLICATIONS

Chinese Office Action dated May 27, 2024 in CN Application No. 202180011728.2, with English translation.
(Continued)

*Primary Examiner* — Bob Zadeh
(74) *Attorney, Agent, or Firm* — Collard & Roe, P.C.

(57) ABSTRACT

A device for applying viscous material to workpieces includes a rotary lance in a holder apparatus and rotatable about a longitudinally-extending rotation axis, the lance having at least one material outlet. A needle valve associated with each material outlet has a longitudinally-extending valve needle used to close each material outlet on a valve seat. Each valve needle has an associated cylinder with a plunger chamber in which a plunger is movable by pressure applied by a fluid, the valve needle being permanently connected to the plunger. A tappet is connected to each plunger, the tappet, at its upper end facing away from the at least one valve seat, being sealingly guided out of the associated plunger chamber. The rotary lance has a measuring element which can be acted upon by the tappet and moved longitudinally; and the holder apparatus has a sensor for determining the measuring element position.

14 Claims, 2 Drawing Sheets

(56) References Cited

U.S. PATENT DOCUMENTS

| | | | | |
|---|---|---|---|---|
| 4,944,243 | A | 7/1990 | Takeno et al. | |
| 10,933,436 | B2 | 3/2021 | Brevemark | |
| 10,960,427 | B2 | 3/2021 | Sauer | |
| 11,850,628 | B2 * | 12/2023 | Bitzel | F16K 31/122 |
| 2008/0257988 | A1 * | 10/2008 | Hahn | B08B 3/026<br>239/525 |
| 2010/0065585 | A1 | 3/2010 | Romanin et al. | |
| 2010/0260531 | A1 * | 10/2010 | Rademacher | B05C 11/1047<br>401/146 |
| 2015/0174541 | A1 * | 6/2015 | Koelle | B29B 7/7457<br>366/155.1 |
| 2021/0039130 | A1 | 2/2021 | Hausner et al. | |
| 2021/0220863 | A1 | 7/2021 | Ikushima | |
| 2023/0026219 | A1 * | 1/2023 | Bitzel | B05B 1/1609 |

FOREIGN PATENT DOCUMENTS

| | | | |
|---|---|---|---|
| CN | 109963657 | A | 7/2019 |
| DE | 89 11 560 | U1 | 1/1990 |
| DE | 8904972 | U1 | 1/1990 |
| DE | 93 21 430 | U1 | 1/1998 |
| DE | 103 45 840 | A1 | 4/2005 |
| DE | 20 2012 006 182 | U1 | 7/2013 |
| DE | 10 2012 012 360 | A1 | 12/2013 |
| DE | 11 2017 002 707 | T5 | 2/2019 |
| DE | 10 2018 104 835 | A1 | 9/2019 |
| EP | 0 237 190 | A2 | 9/1987 |
| WO | 2013/189665 | A1 | 12/2013 |

OTHER PUBLICATIONS

International Search Report in PCT/EP2021/052329, dated May 19, 2021.

German Search Report in DE 10 2020 102 871.7, dated Oct. 5, 2020, with English translation of relevant parts.

English translation of the International Preliminary Report on Patentability and Written Opinion of the International Searching Authority in PCT/EP2021/052329, dated Jul. 28, 2022.

* cited by examiner

DEVICE FOR APPLYING VISCOUS MATERIAL TO WORKPIECES

CROSS REFERENCE TO RELATED APPLICATIONS

This application is the National Stage of PCT/EP2021/052329 filed on Feb. 1, 2021, which claims priority under 35 U.S.C. § 119 of German Application No. 10 2020 102 871.7 filed on Feb. 5, 2020, the disclosure of which is incorporated by reference. The international application under PCT article 21(2) was not published in English.

BACKGROUND OF THE INVENTION

1. Field of the Invention

The invention relates to an apparatus for applying viscous material to workpieces.

2. Description of the Related Art

Such apparatuses are used to apply viscous materials, such as, for example, adhesives, sealants or varnishes to workpieces. In this regard, multiple nozzles having different geometries, mounted on the rotary lance, are often used, into which nozzles a material outlet opens, in each instance. A needle valve is assigned to each material outlet, the valve needle of which closes off or releases the material outlet in question at a valve seat. Cylinders are provided to activate the valve needles, wherein each valve needle is connected with the piston of a cylinder, which is moved by means of applying pressure using a fluid, in particular compressed air. In the case of known apparatuses of the type mentioned initially, the cylinders are arranged next to one another at an equal distance from the valve seats, and the apparatus is controlled in such a manner that always only one of the needle valves opens for material application. In this regard, a need exists for monitoring the switching state of the needle valves, so that it is always recognized when one of the valves is open. Such monitoring can be implemented in a simple manner in the case of apparatuses having only one needle valve, in that a magnet is moved along with the single piston, the position of which magnet is then detected by means of a magnetic sensor of the holding device. However, as soon as the rotary lance has multiple valves such monitoring is almost impossible, since the pistons cannot have a defined position relative to the magnetic sensor, because of the constant rotation of the rotary lance with reference to the holding device. The same thing is the case if the rotary lance has only one needle valve held in it off-center.

SUMMARY OF THE INVENTION

It is therefore the task of the invention to further develop an apparatus of the type stated initially, in such a manner that it can be monitored better.

This task is accomplished by means of an apparatus having the characteristics according to the invention. Advantageous further developments of the invention are discussed below.

The invention is based on the idea of having all the pistons act on a common measuring element by means of the tappets, the position of which element can then be detected by the sensor. In most cases, in this regard, multiple needle valves are present, the cylinders of which are arranged next to one another, in particular in the sense that their cross-sections which are perpendicular to the axis of rotation do not overlap, wherein the lower and/or the upper delimitation surfaces of the piston chambers, for example, are arranged in a plane, in each instance. However, it is also possible that the rotary lance has only one needle valve having a cylinder arranged off-center, in particular, with reference to its center longitudinal axis. The measuring element can be structured with rotation symmetry, at least with reference to its parts that act on the sensor, so that its interaction with the sensor of the holding device does not or does not markedly change, even in the event of a rotation of the rotary lance with reference to the holding device. It is furthermore practical if the axis of rotation is a center longitudinal axis of the rotary lance or of the measuring element. The at least one piston is preferably acted on by means of compressed air, and it is practical if it furthermore has a spring impact as a fail-safe function, which forces it into a position in which the valve needle sits on the related valve seat, forming a seal.

The measuring element can be structured in different embodiments. However, it is preferred that it has a permanent magnet, while the sensor is a magnetic sensor. In this regard, it is preferred that the permanent magnet has the shape of a circular ring that encircles the axis of rotation, so that rotation of the rotary lance with reference to the holding device does not bring with it any change in the interaction of the permanent magnet with the magnetic sensor. In particular, the permanent magnet is poled axially, so that its poles follow one another in the axial direction. In order to save expensive magnetic material, it is preferred that the radius of the circular ring is at least 5 times, preferably at least 8 times as great as its thickness, measured in the radial direction. It is practical if the measuring element has a holding plate that can be impacted by the tappets, on which plate the permanent magnet is fastened.

Preferably the rotary lance has a housing composed of non-ferromagnetic material, in which the at least one cylinder and the measuring element are accommodated. Aluminum, in particular, is a possible material for the housing; it barely hinders detection of the permanent magnet by means of the magnetic sensor.

It is practical if the measuring element can be moved away counter to a reset force in the direction of the at least one cylinder, so that the reset force returns the measuring element back to a starting position that corresponds to the information "all needle valves closed" detected by the sensor, after elimination of the impact of one of the tappets. It is practical if the reset force is applied by means of at least one pressure spring that is arranged between the measuring element and a housing ceiling that delimits the housing toward the top. The at least one pressure spring can be configured as a helical spring.

In the case of multiple cylinders arranged next to one another, it is unavoidable that the tappets impact the measuring element off-center, in each instance. In order to prevent tilting of the measuring element in the housing, it is practical if this element is guided by means of at least one guiding pin that extends in the longitudinal direction, wherein each guiding pin extends through the measuring element. In this regard, it is preferred that one guiding pin is arranged centered, so that the axis of rotation extends through it, while further guiding pins can be arranged off-center. Furthermore, it is preferred that at least one of the guiding pins runs through the center of one of the pressure springs. Furthermore, it is practical if it is provided that the cylinders are arranged at equal distances from one another and at equal distances from the axis of rotation, so as to achieve the greatest possible symmetry. If, furthermore, each tappet is connected off-center with the corresponding piston, and is arranged closer to the axis of rotation than to the longitudinal center axis of the piston, a moment exerted on the measuring element by the tappet is reduced, so that the risk of tilting of the measuring element in the housing is further reduced.

According to a preferred exemplary embodiment, each of the pressure springs has a further pressure spring assigned to it that counteracts it with a weaker reset force and presses against the measuring element from the bottom. It is advantageous if the further pressure springs are also configured as helical spring and arranged around the guiding pins. A reset force that forces the measuring element into its starting position then still results from the forces of the reset springs and the further reset springs. However, provision of the further reset springs helps to prevent tilting of the measuring element in the housing.

BRIEF DESCRIPTION OF THE DRAWINGS

In the following, the invention will be explained in greater detail using an exemplary embodiment shown schematically in the drawing. The figures show.

DETAILED DESCRIPTION OF THE PREFERRED EMBODIMENTS

Figure 2B:
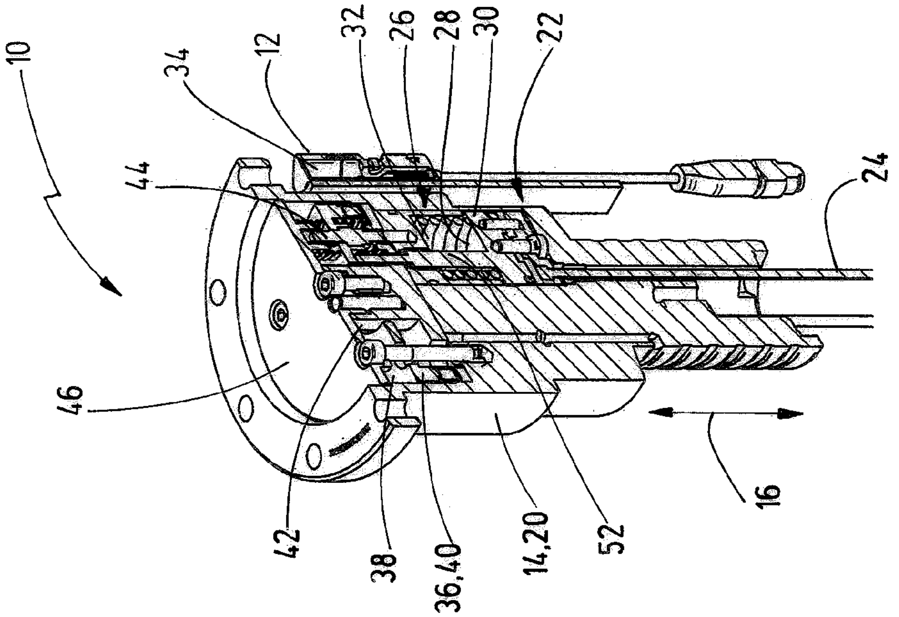
FIG. 2*a*, 2*b* show a part of the apparatus according to FIG. 1 in section, in a side view and in a perspective view.
Figure 2A:
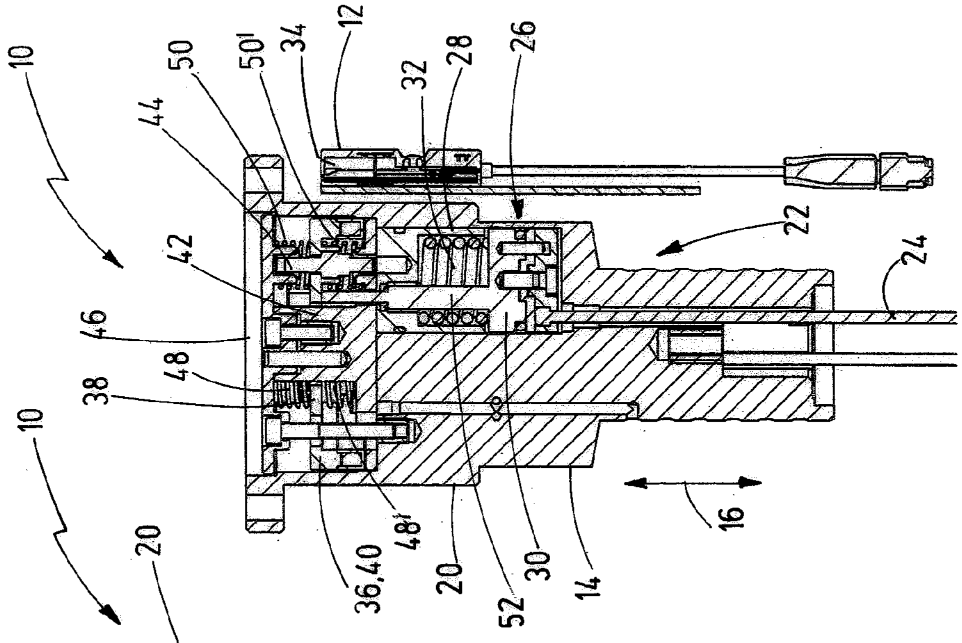
Figure 1:
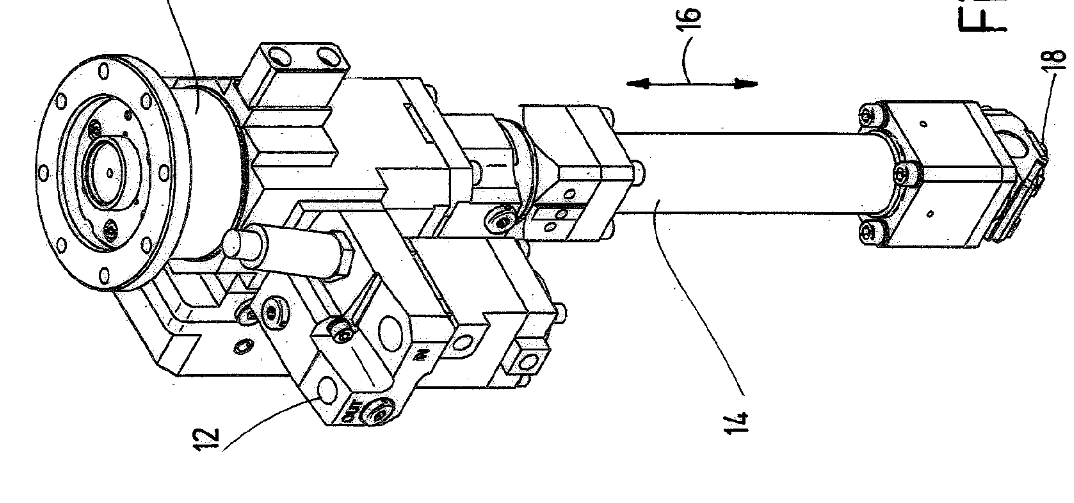
FIG. 1 shows a perspective view of an apparatus for applying viscous material.
Figure 4:
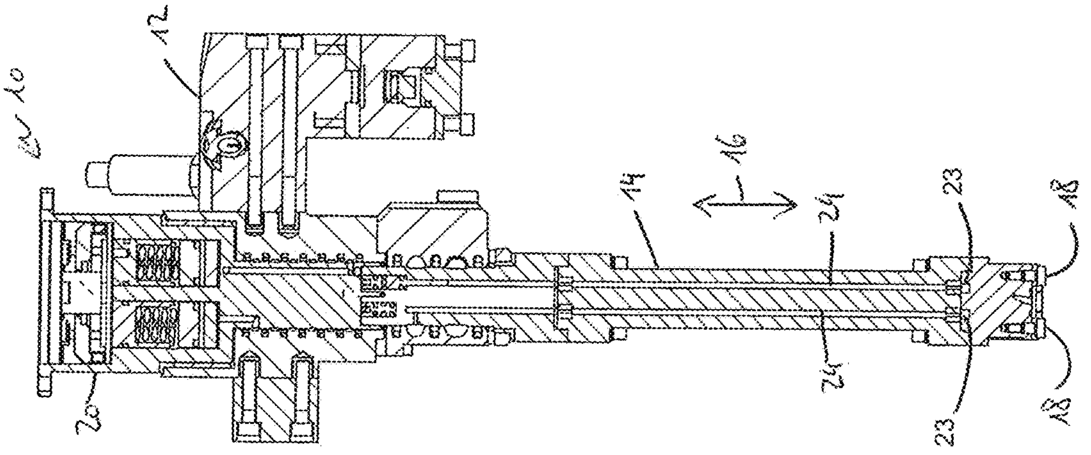
FIG. 4 shows a sectional view of the apparatus shown in FIG. 3 along the line B-B.
Figure 3:
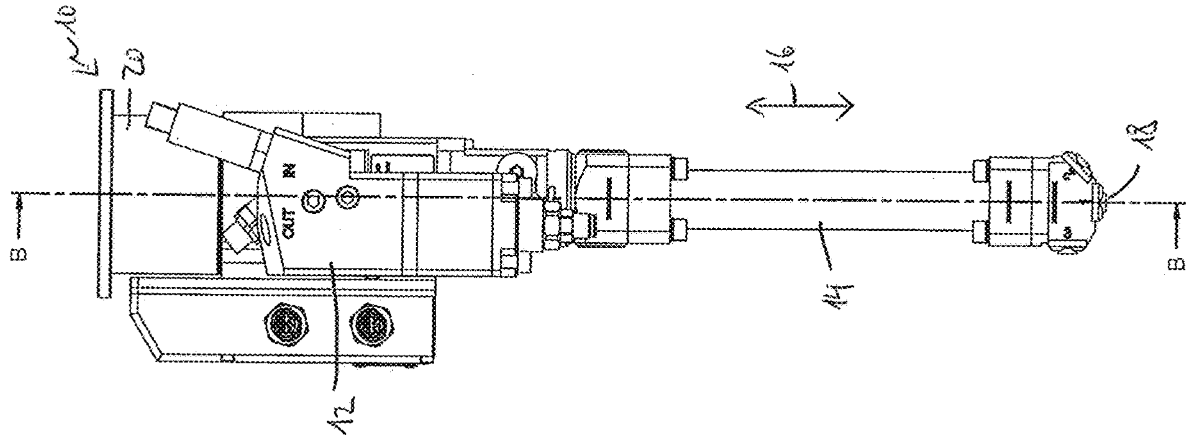
FIG. 3 shows a front view of the apparatus shown in FIG. 1.

The apparatus 10 shown in the drawing serves for applying viscous material to workpieces, in the present exemplary embodiment for applying varnish. However, other uses are also conceivable, such as, for example, the application of adhesives, sealants, insulation material or heat-conducting paste. The application apparatus 10 has a holding device 12, which is intended to be mounted on a robot arm. A rotary lance 14 is mounted in the holding device 12, which lance can rotate about an axis of rotation with reference to the holding device 12, which axis extends in a longitudinal direction 16. At its lower end, the rotary lance 14 has three material outlets 18, from which viscous material can exit to be applied to a workpiece, from a housing 20 of the rotary lance 14 that is produced from aluminum, and at which outlets an application nozzle is generally mounted, in each instance. Three needle valves 22 are accommodated in the housing 20, wherein each needle valve 22 is assigned to one of the material outlets 18. The valve needles 24 of the needle valves 22 each close off one of the material outlets 18 at a valve seat 23, or release the material outlet 18 by means of lifting off from the valve seat 23. Each of the needle valves has a dual-action pneumatic cylinder 26 assigned to it, in the piston chamber 28 of which a piston 30 can be displaced back and forth in the longitudinal direction 16, with which piston the valve needle 24 in question, which also extends in the longitudinal direction 16, is firmly connected. A movement of the piston 30 by means of applying compressed air thereby results in a movement of the valve needle 24 and in opening or closing of the material outlet 18 in question at the valve seat 23. A closing spring 32, arranged in the piston chamber 28 and configured as a helical spring, presses the corresponding piston 30 downward and the valve needle 24 onto the related valve seat 23, so that the material outlets 18 are always closed when the compressed air is not in effect.

The apparatus 10 is controlled in such a manner that only one material outlet 18 is always open at a time. In order to monitor whether one of the material outlets 18 is open or whether all the material outlets 18 are closed, the holding device 12 has a magnetic sensor 34 that is fixed in place. This sensor detects the position of a measuring element 36 that can move in the housing 20 of the rotary lance 14. The measuring element 36 has a holding plate 38 that can be displaced back and forth in the housing 20, in the longitudinal direction 16, and a ring-shaped permanent magnet 40 that is firmly connected with the holding plate 38. The holding plate 38 is guided on a central guiding pin 42 as well as on three outer guiding pins 44, wherein each of the guiding pins 42, 44 extends through an opening in the holding plate 38. A pressure spring 48, 50 supported at the top on a housing ceiling 46 and at the bottom on the holding plate 38 is arranged around each of the guiding pins 42, 44, which spring presses the measuring element 36 downward. In this regard, this involves a central pressure spring 48 arranged around the central guiding pin 42 and three outer pressure springs 50, each arranged around one of the outer guiding pins 44. A tappet 52 is firmly connected with each of the pistons 30, which tappet is passed out from the top of the piston chamber 28 in question, which top faces away from the valve seats 23 and faces the measuring element, and the tappet lies against the holding plate 38. If one of the material outlets 18 is opened by means of raising the piston 30 in question, the tappet 52 connected with this piston 30 presses the measuring element 46 upward, so that the magnetic sensor 34 can detect the movement of the permanent magnet 40. The magnetic sensor 34 then generates a "valve open" signal. If the material outlet 18 is closed again by means of lowering the piston 30 in question, the pressure springs 48, 50 bring about lowering of the measuring element 36, which is detected by the magnetic sensor 34, which generates a "valves closed" signal.

The cylinders 26 are arranged next to one another in the sense that their cross-sections, which are made perpendicular to the longitudinal direction 16, do not overlap. Impacting of the measuring element 36 by means of the tappets 52 therefore cannot take place centrally, in other words in the center of the holding plate 38. In order to prevent tilting of the measuring element 36 in the housing 20, the tappets 52 are arranged off-center on the piston 30 and offset as far as possible in the direction toward the center of the holding plate 38 or in the direction of the center longitudinal axis of the rotary lance 14. Furthermore, a further, weaker pressure spring 48', 50' lies opposite each of the pressure springs 48, 50, the former pressing against the holding plate 38 from below. In this regard, the pressure springs 48, 50 and the further pressure springs 48', 50' are dimensioned in such a manner that each pair, consisting of one of the pressure springs 48, 50 and the opposite further pressure spring 48', 50', exerts a force on the holding plate 38, in total, that is directed downward, in other words in the direction toward the cylinders 26.

In the exemplary embodiment shown, the rotary lance 14 has three needle valves 22. It is obviously understood that the rotary lance 14 can be equipped with one, two or more than three needle valves 32.

In summary, the following should be stated:

The invention relates to an apparatus 10 for applying viscous material to workpieces, having a rotary lance 14 arranged to rotate about an axis of rotation that runs in a longitudinal direction 16, in a holding device 12, which lance has at least one material outlet 18, wherein a needle valve 22 is assigned to each material outlet 18, by means of the valve needle 24 of which, extending in the longitudinal direction 16, the corresponding material outlet 18 can be closed off at a valve seat 23, and wherein a cylinder 26 is assigned to each valve needle 24, in the piston chamber 28 of which cylinder a piston 30 can be moved by means of a fluid, by applying pressure, with which piston the valve needle 24 is firmly connected. According to the invention, it is provided that a tappet 52 is connected with each piston 30, which tappet is passed out of the piston chamber 28 in question, in a sealed-off manner, on the top that faces away from the at least one valve seat 23, that the rotary lance 14 has a measuring element 36 that can be impacted by means of the tappets 52 and displaced in the longitudinal direction 16, and that the holding device 12 has a sensor 34 for determining the position of the measuring element 36.

The invention claimed is:

1. An apparatus for applying a viscous material to workpieces, comprising:

a holding device;

a rotary lance arranged to rotate in the holding device about an axis of rotation that runs in a longitudinal direction, wherein the rotary lance comprises at least one material outlet, a needle valve assigned to the at least one material outlet, the needle valve comprising a valve needle extending in the longitudinal direction and configured to close off the at least one material outlet at a valve seat, a cylinder assigned to the valve needle, the cylinder comprising a piston chamber, a piston connected to the valve needle and movable by applying pressure in the piston chamber using a fluid, and a tappet connected with the piston and passed through out of the piston chamber at an end face of the piston chamber that faces away from the valve seat so as to seal off the piston chamber; and a measuring element configured to be displaced in the longitudinal direction by applying a force using the tappet;

wherein the holding device has a sensor for determining a position of the measuring element.

2. The apparatus according to claim 1, wherein the rotary lance has a plurality of cylinders, a plurality of material outlets, and a plurality of needle valves, each needle valve of the plurality of needle valves being assigned to a respective material outlet of the plurality of material outlets and comprising a respective valve needle extending in the longitudinal direction and configured to close off the respective material outlet assigned to the needle valve at a respective valve seat, a respective cylinder assigned to the respective valve needle comprising a respective piston chamber, a respective piston connected to the respective valve needle and movable by applying pressure in the respective piston chamber using a fluid, and a respective tappet connected with the respective piston and passed through out of the respective piston chamber at an end face of the respective piston chamber that faces away from the respective valve seat so as to seal off the respective piston chamber.

3. The apparatus according to claim 2, wherein the plurality of cylinders are arranged at equal distances from one another and at equal distances from the axis of rotation.

4. The apparatus according to claim 1, wherein the measuring element has a permanent magnet and wherein the sensor is a magnetic sensor.

5. The apparatus according to claim 4, wherein the permanent magnet has the form of an axially poled circular ring that has a ring thickness and rotates about the axis of rotation, and wherein the axially poled circular ring has a radius at least 5 times as great as the ring thickness, measured in a radial direction.

6. The apparatus according to claim 5, wherein the radius is at least 8 times as great as the ring thickness, measured in the radial direction.

7. The apparatus according to claim 4, wherein the measuring element has a holding plate, wherein the force is applied to the holding plate using the tappet, and wherein the permanent magnet is fastened to the holding plate.

8. The apparatus according to claim 1, wherein the rotary lance has a housing composed of non-ferromagnetic material, in which the cylinder and the measuring element are accommodated.

9. The apparatus according to claim 8, wherein the measuring element is configured to receive a reset force applied to a first end of the measuring element in the direction of the cylinder, wherein the measuring element is moved against the reset force when the valve needle is lifted off the valve seat.

10. The apparatus according to claim 9, wherein the reset force is applied by at least one pressure spring that is arranged between the measuring element and a housing ceiling of the housing.

11. The apparatus according to claim 10, wherein at least one further pressure spring is assigned to the at least one spring and applies against a second end of the measuring element a further reset force less than and opposite to the reset force.

12. The apparatus according to claim 10, wherein the measuring element is guided by at least one guiding pin that extends in the longitudinal direction through the measuring element.

13. The apparatus according to claim 12, wherein the at least one guiding pin is arranged centered through the at least one pressure spring, and wherein the at least one pressure spring is configured as a helical spring.

14. The apparatus according to claim 1, wherein the tappet is connected off-center with the piston and is arranged closer to the axis of rotation than a longitudinal center axis of the piston.

* * * * *